United States Patent [19]

Hoover et al.

[11] Patent Number: 4,934,041
[45] Date of Patent: Jun. 19, 1990

[54] METHOD OF ASSEMBLING BRUSHLESS ELECTRIC MOTORS

[75] Inventors: John W. Hoover, Huntington; Anthony C. Laraia, Torrington, both of Conn.

[73] Assignee: Nidec Corporation, Torrington, Conn.

[21] Appl. No.: 225,088

[22] Filed: Jul. 27, 1988

[51] Int. Cl.⁵ .............................................. H02K 15/14
[52] U.S. Cl. ...................................... 29/596; 29/840; 310/42; 310/71; 310/91
[58] Field of Search .......... 29/596, 598, 840, 837–839; 310/68 R, 71, 42, 91

[56] References Cited

U.S. PATENT DOCUMENTS

| | | |
|---|---|---|
| 3,191,135 | 6/1965 | Hazelquist . |
| 3,596,139 | 7/1971 | Walsh . |
| 4,003,128 | 1/1977 | Dochterman . |
| 4,099,104 | 7/1978 | Müller . |
| 4,115,715 | 9/1978 | Müller . |
| 4,357,550 | 11/1982 | Müller . |
| 4,519,010 | 5/1985 | Elsaesser et al. . |
| 4,540,906 | 9/1985 | Blom . |
| 4,604,665 | 8/1986 | Müller et al. . |
| 4,633,110 | 12/1986 | Genco et al. . |
| 4,673,834 | 6/1987 | Wrobel .................................. 310/71 |
| 4,703,209 | 10/1987 | Wrobel . |
| 4,800,307 | 1/1989 | Papst . |

FOREIGN PATENT DOCUMENTS

| | | |
|---|---|---|
| 7909080 | 7/1979 | Fed. Rep. of Germany . |
| 7909080 | 7/1979 | Fed. Rep. of Germany . |
| 3144630 | 5/1983 | Fed. Rep. of Germany . |
| 2415839 | 7/1983 | Fed. Rep. of Germany . |
| 7824009 | 6/1984 | Fed. Rep. of Germany . |
| 8138692 | 9/1984 | Fed. Rep. of Germany . |
| 3427994 | 1/1986 | Fed. Rep. of Germany . |
| 8712486 | 12/1987 | Fed. Rep. of Germany . |

OTHER PUBLICATIONS

"New Products", from Electronic Design, Apr. 16, 1987, issue.

Primary Examiner—Carl E. Hall
Attorney, Agent, or Firm—McCormick, Paulding & Huber

[57] ABSTRACT

A method of assembling brushless electric motors the steps of forming stator-printed circuit board assemblies from an array of printed circuit boards each having at least one integral portion extending from a printed circuit board surface for establishing the interrelationship between the printed board and at least one another motor component, such as the stator. The present method also locates the commutation circuit triggering sensor with great precision and is readily adapted to automation.

40 Claims, 3 Drawing Sheets

METHOD OF ASSEMBLING BRUSHLESS ELECTRIC MOTORS

TECHNICAL FIELD

This invention relates to methods of assembly for brushless electric motors and more particularly to a method of assembly for a direct current brushless motor that is characterized by a molded printed circuit board having at least one integral portion extending from a surface thereof for locating the printed circuit board with respect to at least one other motor component.

BACKGROUND OF THE INVENTION

Brushless electric motors are well known in the art and are characterized by internal electric circuitry which provides electrical commutation. Brushless direct current (D.C.) motors are routinely produced in high volume for use in a multitude of industrial applications such as fan motors. As a result, it is imperative that the design of the motor be simple, and that it can be adapted to low cost automated manufacture and assembly techniques.

Known brushless direct current motors include the electric fan motor No. TA 300 D.C. manufactured by the NIDEC Corporation of Torrington, Connecticut. This motor includes a rotor and a housing. Concentric with the rotor is a stator and a printed circuit board, both mounted within the housing. On the printed circuit board are electrical components which comprise a commutating circuit. The circuit contains a sensor, typically a Hall cell, which is used as a trigger. Such sensors are characterized by a limited range, and therefore must be carefully located with respect to the stator and the rotor.

The precision with which the sensor must be positioned has limited the extent to which the motor assembly can be automated. Known motors are assembled from discrete subassemblies, with the sensor located on one subassembly (a printed circuit board), while the stator comprises another. Production tolerances of known subassemblies will, when configured together, often produce a stator-sensor relative position which will be out of the sensor's range in an unacceptable number of motors.

For example, while stators of a known design can be snapped onto a bearing tower assembly within the housing, tolerances in stator magnet laminations must be considered in the design of the snap engagement mechanism. As a result of the clearance needed for stator magnet laminations, the stator can be located with respect to the bearing tower only with limited precision. The printed circuit board containing the sensor is fixed separately to the housing, and will then have an unacceptably wide range of vertical and angular positions with respect to the stator. Since the printed circuit board is two dimensional and lacks any intrinsic means for fixturing, it must be manually affixed within the housing at a position which will ensure that the sensor is located within its range. The absence of any self-fixturing mechanism with the printed circuit board also precludes the use of automated assembly techniques with respect to the printed circuit board, and ultimately limits the adoption of automated assembly techniques with respect to the other motor components.

To accomplish precise sensor location, known brushless electric motors using a conventional two dimensional printed circuit board require separate positioning of the magnetic sensor out from the plane of the printed circuit board. These motors are characterized by a separate pedestal or an equivalent that must be attached to the printed circuit board. A separate pedestal offers only marginal improvement in the accuracy of sensor location and adds another labor intensive step to the motor assembly process.

It would be advantageous to have a method of assembling an electric motor characterized by a printed circuit board which allows for self-fixturing and simplified assembly with other motor components, and which further would provide for a precisely located sensor. The present invention is drawn towards such a method.

SUMMARY OF THE INVENTION

An object of the present invention is to provide a method for assembling a motor having printed circuit board characterized by an integral projection therefrom for locating the printed circuit board with at least one other motor component.

Another object of the present invention is to provide a method for assembling a brushless motor having a printed circuit board characterized by an integral projection on which is mounted a triggering sensor, part of an electrical commutation circuit.

Still another object of the present invention is to provide a method for assembling a motor having a snap engagement mechanism for locating a stator with respect to a housing such that the precision with which the stator is located is independent of the production tolerances of any other motor component.

Still another object of the present invention to provide a method for assembling a brushless direct current motor from an array of printed circuit boards characterized by an integral projection for locating the printed circuit board with at least one other motor component.

According to the present invention a method of assembling an electric motor includes the steps of configuring a stator having a first snap engagement mechanism on a support means with a second snap engagement mechanism integrally formed with a printed circuit board to form a stator-printed circuit board assembly. The stator-printed circuit board assembly is configured with a cooperative locating device formed on an inner surface of a housing. The method also includes the step of affixing a rotor to the housing locating device.

According to another aspect of the present invention a method of assembling a brushless electrical motor includes the steps of affixing a printed circuit board having electrical components to an inner surface of a housing. A stator having a first snap engagement mechanism is configured with a second snap engagement mechanism formed in a locating device, the second snap engagement mechanism is formed adjacent to the housing inner surface The method also includes the step of affixing a rotor to the housing.

According to still another aspect of the present invention a method of assembling brushless electrical motors from an array of molded printed circuit boards each having a plurality of electrical components that comprise an electrical commutation circuit and each having an integral projection from a surface thereof with a first attachment mechanism adjacent to the free end portion thereof, the method includes the steps of affixing a stator at a second attachment mechanism thereof to corresponding ones of the printed circuit board first attachment mechanism to form assemblies. The stators are electrically connected to the printed circuit boards and the assemblies are then separated from the array. Each assembly is, at a third attachment mechanism thereof, affixed to a corresponding locating device at a fourth attachment mechanism. The fourth attachment mechanism extends from an inner surface of a corresponding housing. The method also includes a step of affixing a rotor to each of the locating devices.

According to still another aspect of the present invention a method of assembling brushless electrical motors from an array of molded printed circuit boards each having a plurality of electrical components that comprise an electrical commutation circuit, including a sensor, and each printed circuit board having a first attachment mechanism and an integral projection with a precisely located surface at the free end portion thereof with the sensor mounted on the surface, the method includes the steps of affixing a stator at a second attachment mechanism thereof to corresponding ones of the printed circuit board first attachment mechanisms to form assemblies such that the sensor is positioned at a selected angular distance between and displacement from poles of an electromagnet formed on the stator. The stators are electrically connected to the printed circuit boards and then the assemblies are separated from the array. Each of the assemblies are affixed at a third attachment mechanisms thereof to corresponding fourth attachment mechanism extending from an inner surface of a corresponding housing. The method also includes the step of affixing a rotor to each of the locating means.

DESCRIPTION OF THE PREFERRED EMBODIMENT

Figure 1:
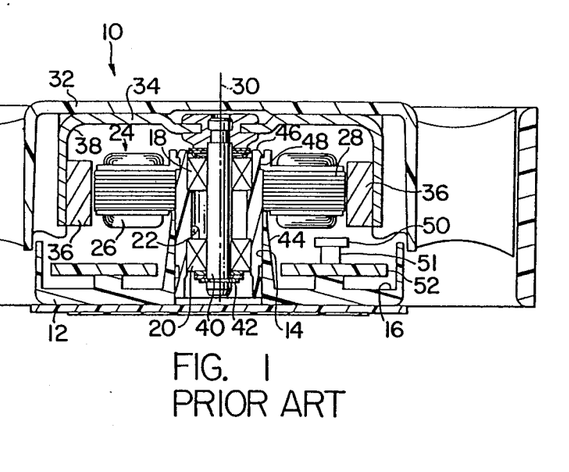
FIG. 1 is a sectioned illustration of a known motor.

Referring now to FIG. 1, there is illustrated, in section, a known electric motor 10. The motor comprises a housing 12 having a tubular bearing tower 14 centrally configured on an inner surface 16 of the housing. The bearing tower 14 typically comprises a turned metal bearing tower having bearings 18 and 20 located in a tower inner surface 22.

A stator 24 comprises a support mechanism 26 which receives a plurality of laminations 28. The stator preferably comprises two wound electromagnets whose poles are spaced 90 degrees apart about a central axis 30 and include the laminations.

An impeller 32 is preferably formed from plastic. A rotor 34 has a permanent magnet 36 formed on an inner surface 38 of the rotor. Also included is a central shaft 40 about which the rotor rotates. The rotor shaft is received through the opening in the bearing tower and is secured by snap ring 42.

The fan 10 is characterized by a bearing tower outer surface 44 having a mechanism formed therein to receive a corresponding mechanism formed in an inner surface of the stator support mechanism such that the bearing tower is snap engaged with the stator. The snap engagement mechanism preferably comprises a tab 46 formed on the bearing tower outer surface at an outer, distal end of the tower, and a corresponding recess 48 formed in the support mechanism inner surface.

Note that the snap engagement mechanism is configured at the outer end of the bearing tower. The construction of the stator electromagnet is such that the clearance needed to accommodate variations in the lamination thickness limit the precision with which the snap mechanism can configure the stator with respect to the other motor components. This construction therefore limits the accuracy with which the stator can be located with respect to a commutating trigger sensor 50 mounted on pedestal 51 on a printed circuit board 52.

In the motor 10, the pedestal is snap engaged to the printed circuit board. Other motors have the triggering sensor freestanding on leads. The sensor, typically a Hall effect device, must be precisely positioned beneath an opening (not shown) between adjacent poles of the electromagnets. The vertical displacement from the electromagnet poles as well as the angular position of the sensor relative to the poles is critical for the proper operation of the motor. The motor 10 cannot be assembled in a fully automated manner since the summation of the tolerances in (1) the assembled location of the printed circuit board, (2) the snap engagement mechanism of the stator to the bearing tower and (3) the assembled location of the sensor on the printed circuit board will too often result in an unacceptable sensor location.

Figure 2:
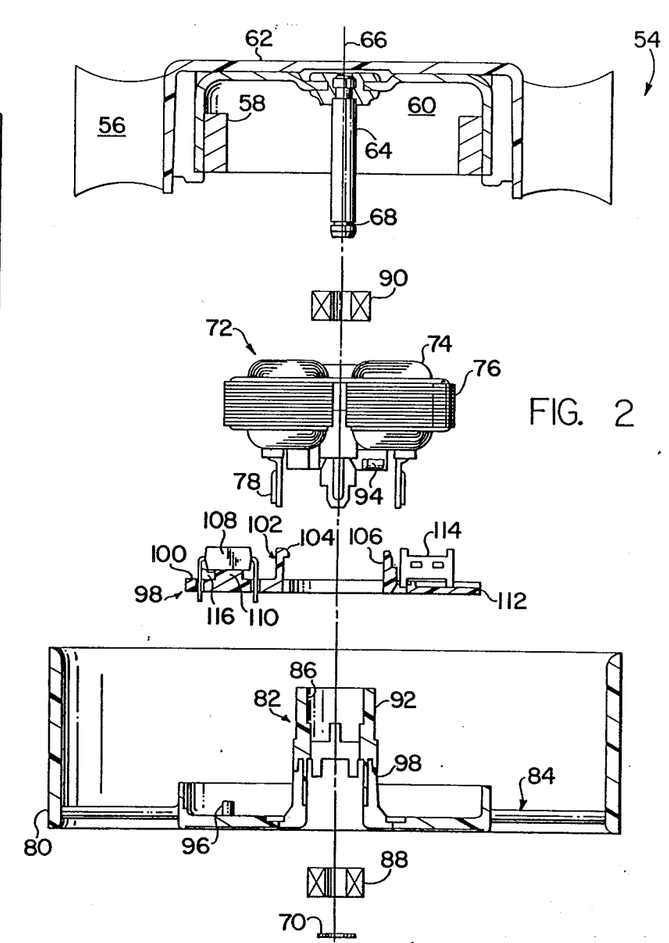
FIG. 2 is an exploded sectioned illustration of a motor assembled according to the present invention.

Referring now to FIG. 2, there is shown in an exploded sectioned illustration, a motor 54 provided according to the present invention. The motor 54 includes an outer impeller 56. Inside the impeller is a permanent magnet 58 fixed to an interior surface 60 of a rotor 62. The rotor has a centrally located shaft 64 along axis 66 about which the rotor will spin. At a distal end of the shaft is a groove 68 for receiving snap ring 70 that is used in a known manner for locating the rotor with respect to the other motor components.

A stator 72 is concentric with the rotor and comprises a plastic support 74 adapted to receive a plurality of laminations 76. A support cover (not shown) of a known type can also be included. An opposed pair of electromagnets is formed in a known manner which includes the laminations. The stator support is configured to have a central tubular opening and a plurality of electrical connectors 78 which extend from the stator support.

The motor 54 also comprises a housing 80 having a centrally located bearing tower 82 projecting from an inner housing surface 84. In the preferred embodiment, the housing and bearing tower are integrally molded of plastic. The bearing tower is tubular, and has an inner surface 86 adapted to receive bearings 88 and 90. The shaft 64 is received by the bearings and affixed to the housing by the snap ring 70 when the motor is completely assembled.

Additionally, the bearing tower has an outer surface 92 that has a recess 93. The stator support has a projection 94 extending toward the housing inner surface. The projection inner surface, together with the bearing tower recess comprise a snap engagement mechanism. The present snap engagement mechanism is preferably located adjacent to the housing inner surface 84.

As noted hereinabove, known motors employing a snap engaged stator position the snap engagement mechanism at a free end of the bearing tower, yielding a stator that is not precisely located with respect to a commutation sensor. However, with the present invention the precision of the positioning of the stator with respect to the bearing tower is independent of the tolerance of the stator laminations, or the tolerances of any other motor component. In turn, the accurately located stator produces less variation in the position of the stator with respect to a sensor.

Also included in motor 54 is a locating post 96 which is molded with the housing to extend from the inner surface. As detailed hereinafter, the post 96 is configured to be in registration with an electrical element on a printed circuit board which contains a commutation circuit trigger sensor. The length of the post 96 is selected to contact the printed circuit board and adjust or limit the displacement of the printed circuit board from the housing inner surface. Since the sensor is positioned on the integral pedestal, the position of the sensor relative to the rotating magnet is controlled by the height of the post.

A printed circuit board 98 is also included in the motor for locating electrical components that comprise the requisite commutation circuitry. The printed circuit board in the preferred embodiment is molded and is characterized by one or more integral surfaces which depart from a plane 100 of the board Although preferably generally planar, those skilled in the art will note that the printed circuit board can be nonplanar and can be formed to be received by other motor components, such as the housing. Nonplanar is defined to include surfaces which are arcuate throughout, or at least partially arcuate, as well as planar surfaces with at least a portion thereof which departs from the plane of the surface. Included by this definition therefore are printed circuit boards having a curved or planar surface where a portion departs from the remainder of the surface at an angle as well as curved or planar printed circuit boards which include a portion that is raised or recessed from the remainder of the surface. A printed circuit board of the type used in the present motor is detailed in the copending commonly owned U.S. patent application entitled "A Molded Printed Circuit Board For Use with a Brushless Electric Motor", and incorporated herein by reference. For example, a first projection 102 extends from the printed circuit board plane and further comprises an integral tab 104 at a distal end thereof. As detailed hereinafter, the tab comprises a means for snap engagement to a cooperative element surface in the stator support.

Also extending from the surface of the printed circuit board is a second projection 106 which keys the printed circuit board to the stator so that the stator may receive the printed circuit board in only one relative position. The extending key 106 is received by a cooperative element on the stator support and also prevents relative rotation of the printed circuit board with respect to the stator. Those skilled in the art will note that a stator and printed circuit board as described hereinabove can be directly assembled with each other to form a stator-printed circuit board assembly in which the tolerances of other motor components no longer effect the position of the sensor relative to the stator. As a direct consequence of the present stator and printed circuit board, the amount of automated assembly possible for the motor 54 is greatly increased.

Also shown in FIG. 2 is the integrated circuit 108 which preferably includes a sensor element, such as a Hall effect device. As is known in the art, a brushless motor comprises a commutation circuit including a sensor for detecting the passage of the rotating permanent magnet poles with respect to the poles of an electromagnet for triggering the commutation circuitry. In known brushless motors, such as the motor 10, the Hall effect device is a discrete element manually positioned relative to the surface of the printed circuit board so that when the motor was assembled, the device was positioned at a precise angular location with respect to the stator permanent magnet poles, and was spaced from the stator poles within a preestablished range.

As detailed hereafter, the present printed circuit board is molded such that a portion thereof is raised from the surface 100 so that, the sensor will be properly positioned when the printed circuit board is assembled with the stator. This is accomplished in the preferred embodiment by the fabrication of the printed circuit board with an integral pedestal 110. The printed circuit board 98 also includes another, substantially planar portion 112 recessed from the plane 100 of the printed circuit board. The recessed portion is configured to be at a depth from the plane such that a standard electrical component such as a connector can be used. Without such a recessed portion the use of inexpensive electrical components is not possible. Instead, electrical leads must be manually soldered to the printed circuit board.

The present printed circuit board provides (1) selffixturing of the printed circuit board with motor components, (2) accurate positioning of components such as the sensor, integrated circuit or connector, and (3) allows for the use of inexpensive electrical components without modification to the existing stator, since the clearance between the receiving portion of the printed circuit board and the stator can be custom selected and incorporated into the printed circuit board mold. In contrast, known printed circuit boards used in brushless motors simply provide two dimensional location of electrical elements such as resistors, capacitors and integrated circuits.

Figures 3, 5:
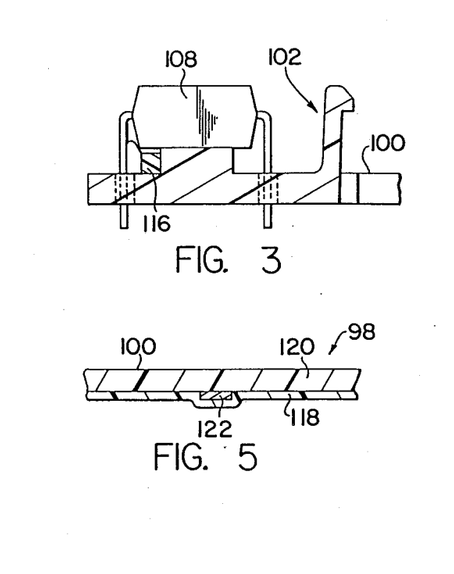
FIG. 3 is a detailed sectioned illustration of a portion of a printed circuit board of the motor of FIG. 2.
FIG. 5 is a side illustration of a portion of the printed circuit board of FIG. 3.

Also shown in FIG. 2 and detailed in FIG. 3, a pedestal standoff 116 is molded to comprise an outer radial portion of the pedestal 110. The outer radial standoff 116 is integral with the pedestal, and is included to provide for more precise radial positioning of the sensor or sensor containing element, such as integrated circuit 108, and prevents portions of the rotor from rubbing on the integrated circuit as it rotates.

Figures 4, 6, 7:
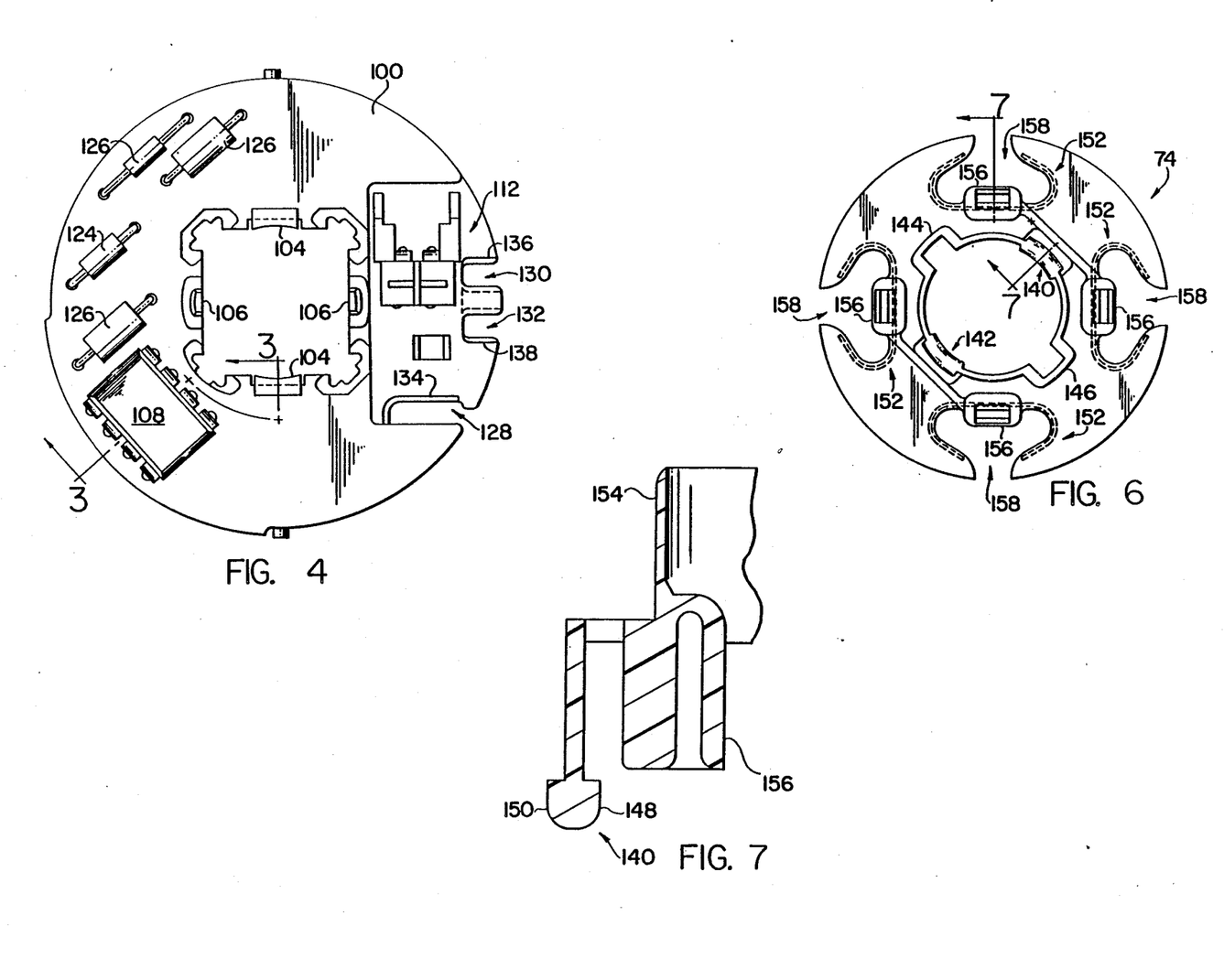
FIG. 4 is a top illustration showing a printed circuit board of the motor of FIG. 2.
FIG. 6 is a top view of a stator support of the motor of FIG. 2.
FIG. 7 is a sectioned illustration of a portion of the stator support of FIG. 5.

Referring now to FIGS. 4 and 5, there is shown a top planar view of surface 100 (FIG. 4) and a sectioned planar illustration of a portion of the printed circuit board 98 (FIG. 5). As shown in FIG. 5, the printed circuit board 98 is multilayered, comprising opposed first and second layers 118 and 120, with a plurality of electrical conductors, formed therebetween. The first layer 118 is electrically insulating and is configured on a second layer inner surface and the conductors. In FIG. 2, post 96 contacts the first layer. The conductors, such as conductor 122 preferably comprises deposited metal formed in a conventional manner. Surface 100 is an outer surface of the second layer.

Electrical components such as resistors 124, diodes 126 and integrated circuit 108 contact selected ones of the conductors and comprise a commutation circuit. The printed circuit board projection 104 is shown along with key standoff 106 about a central opening in the printed circuit board.

Recessed portion 112 is detailed in FIG. 4 and is configured in the preferred embodiment to receive a connector 114 shown in FIG. 2. The connector is configured so that the electrical wires (FIG. 10) needed for connection to an external power source will pass through an opening 128. Other electrical wires pass through openings 130,132. It is preferable that the openings be provided with a chamfered edge 134,136,138 to provide a strain relief for the electrical wires. Also shown in FIG. 3 are integral attachment tabs 139 which extend outwardly from the printed circuit board. The tabs connect adjacent the printed circuit boards and maintain the printed circuit boards in an array during subsequent motor assembly.

Referring now to FIGS. 6 and 7, there is illustrated a top view of the stator support 74 (FIG. 6) and a sectioned portion thereof (FIG. 7). The stator support is one piece and preferably comprises molded plastic to include projecting tabs 140 and 142 positioned 180 degrees apart about a central opening. Also included are slots 144,146 for receiving the corresponding projections 106 from the printed circuit board. In the preferred embodiment, the printed circuit board tab 104 is configured to be received at an outer extension 148 of a stator tab, while the corresponding bearing tower recess is configured to receive an opposed inner extension 150. Those skilled in the art will note that while the tab 140 preferably comprises the snap engagement mechanisms for connecting the stator with both the printed circuit board and the bearing tower, supplemental tabs may be provided spaced about the support central opening to comprise one or the other snap engagement mechanism.

The stator support additionally comprises a plurality of projections 152 configured about the support central opening separated by 90 degrees. The projections 152 receive the stator laminations and the electromagment windings at a first portion 154 to form an electromagnet of known design. Each projection also comprises an opposed receptacle 156 for receiving an electrical connector (157 FIG. 2) to extend therefrom. The poles of adjacent electromagnets are separated by openings 158, formed in the stator support. As detailed hereinabove, the commutating sensor is positioned beneath the stator support on the printed circuit board at a precise angular location in registration with one of the openings 158.

Although shown and described with respect to a motor having an external rotor those skilled in the art will note that the present invention can be readily adapted to motors having an internal rotor and can be used with both D.C. and A.C. motors with appropriate modification to the motor components.

In assembling the motor 54, a plurality of conventional stator laminations are manually combined with a corresponding stator support. It is preferable that a top portion (not shown) be positioned on the stator support to encompass the laminations. Electric terminals are then inserted, typically by a known terminal insertion machine into the corresponding receptacles (156, FIG. 5) in the stator support. Next, a conventional winding machine winds each of the stator laminations with magnet wire to form two opposed electromagnets. The winding machine attaches respective portions of the wire to the terminals, thereby completing the stator.

The preferred printed circuit boards are molded in an array and maintained therein for several subsequent steps during the assembly of the motor by means of attachment tabs 139. After the printed circuit board is molded each printed circuit board is configured in a conventional manner with the requisite commutation circuitry described hereinabove on one surface of the board. The electrical connectors are preferably formed on an opposed surface by conventional photolithographic and metalization techniques to provide interconnection between the commutation circuitry. An insulating layer is also applied to the connectors to complete the printed circuit board.

Figures 8, 9, 10:
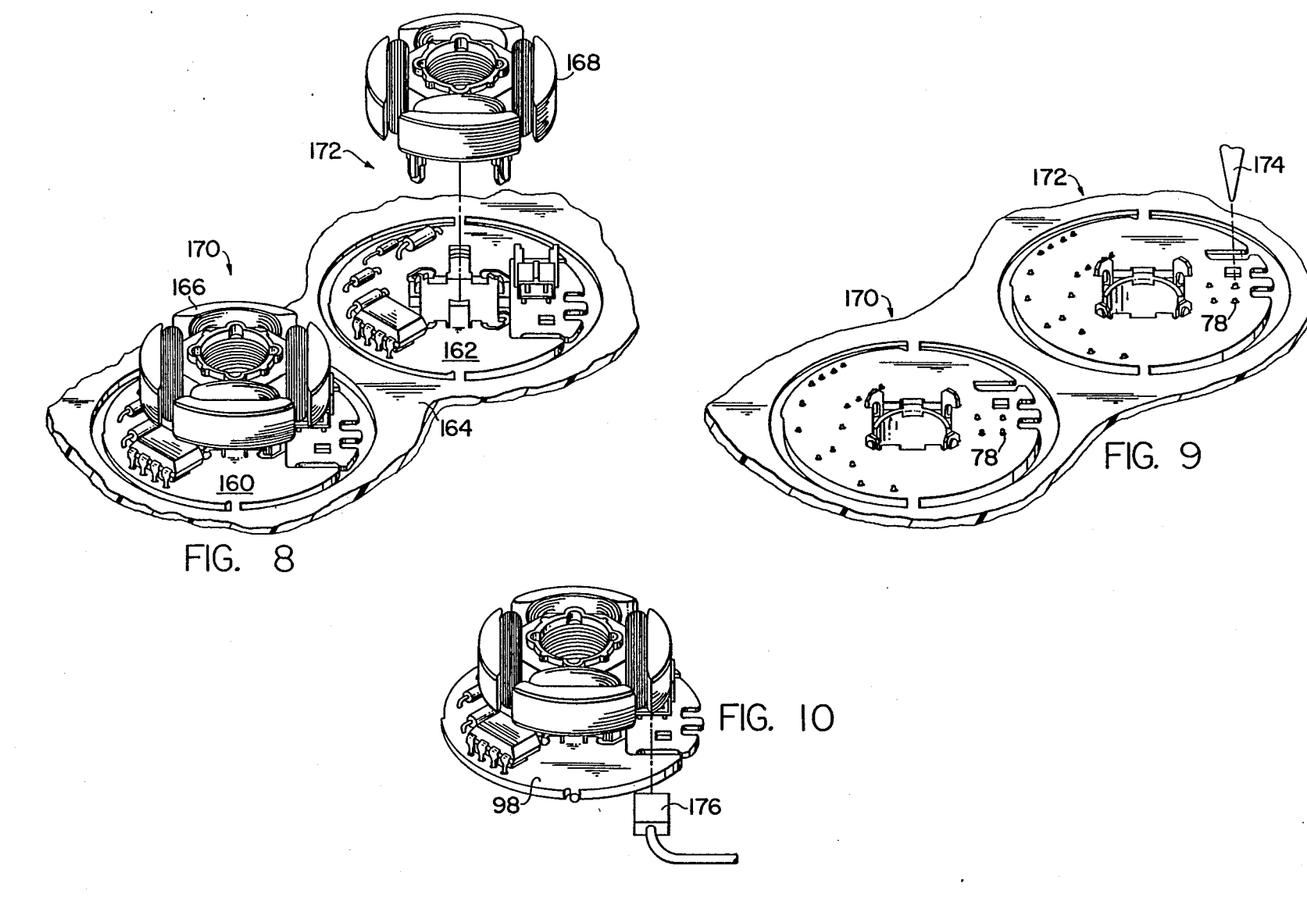
FIG. 8 is an exploded diagram showing a portion of an array of printed circuit boards receiving corresponding stators.
FIG. 9 is an exploded illustration of a portion of an array of stator-printed circuit board subassemblies during a soldering process.
FIG. 10 is an illustration of a stator-printed circuit board subassembly receiving an electrical connector.

As shown schematically in FIG. 8, each printed circuit board 160,162 in a molded array 164 is then provided with a corresponding stator 166,168 to form stator-printed circuit board assemblies 170,172. Since the stators and printed circuit boards are each molded with a cooperative engagement mechanism, such as the preferable snap engagement mechanism described hereinabove, the assembly of the stator with the printed circuit boards is greatly simplified. This is especially true if the printed circuit boards and stators are configured with a keying mechanism so that a printed circuit board can only be assembled with a stator in one relative orientation. Such a printed circuit board and stator combination removes any possibility of misconfiguring the stator with the printed circuit board. Moreover, a snap engaged stator-printed circuit board assembly that is also characterized by a keying mechanism additionally improves the quality of the motors by eliminating differences in commutation circuitry component location between printed circuit boards. As a result, stators and sensors mounted on printed circuit boards are uniformly aligned with little or no variation in the sensor vertical displacement or angular position. In contrast, known motors require several manual assembly steps, each of which produce undesirable angular and vertical displacement variations in the location of the sensor. The stator-printed circuit board method of assembly described hereinabove marks an important point of departure of the present invention over the prior art.

An additional advantage provided by the present invention is that the individual stator-printed circuit board assemblies are maintained in a planar array which allows for the use of automated soldering or fusing machinery detailed in FIG. 9. In the preferred embodiment, each of the stator-printed circuit board assemblies have the connectors 78 soldered to the appropriate surfaces on the printed circuit board by an automatic soldering machine 174. The machine is of the type known in the art, and is programmed to sequentially solder the stator connectors to the corresponding receiving surfaces on the printed circuit boards. Once the soldering process for a particular array is completed, the soldered leads are then inspected, either manually or by automatic equipment. The array containing the soldered, inspected stator-printed circuit board assemblies is then provided to a printed circuit board press which separates the printed circuit board-stator assemblies, one from another.

Each of the printed circuit boards in the preferred embodiment is configured with a conventional connecter (114, FIG. 2). As shown schematically in FIG. 10, each of the connectors receives a corresponding wire harness 176 which snaps into the connector. The stator-printed circuit board harness assembly is then located in the housing to be received by a snap fit mechanism of the type described hereinabove. Since the stator-printed circuit board-harness assembly is self-fixturing with respect to the housing, installation is simplified and can be accomplished either manually or by using automatic techniques. Those skilled in the art will note that with known motors, the use of inexpensive, standardized said connectors which simplify assembly is possible by the use of the present printed circuit board, since the present molded printed circuit board receiving planar portion 112 can be appropriately modified. Without the present printed circuit board, each lead for external connection must be manually positioned and soldered on the board. The present method also provides electrical contacts of uniform quality. Finally, the rotor shaft is slid through the bearing tower, and the snap ring 70 is installed.

Similarly, although the invention has been described hereinabove with respect to a preferred embodiment thereof, those skilled in the art will note that certain substitutions, deletions and additions thereto can be made therein without departing from the spirit and scope of the present invention.

We claim:

1. A method of assembling a motor comprising the steps of:
    providing a stator including a first snap engagement means integrally formed on a stator support means;
    molding a printed circuit board having an integral second snap engagement means;
    assembling a sensor with said printed circuit board;
    assembling said printed circuit board with said stator by means of said first and second snap engagement means to form a stator-printed circuit board assembly such that the snap engagement locates said sensor is a predetermined, preferred position with respect to said stator,
    assembly said stator-printed circuit board assembly with a cooperative locating means formed on an inner surface of a housing; and
    affixing a rotor to said locating means.

2. The method of claim 1 wherein said stator includes a third snap engagement means and said locating means includes a fourth snap engagement means, said method further comprising the steps of configuring said stator third snap engagement means with said locating means fourth snap engagement means.

3. The method of claim 2 further comprising the steps of providing said fourth snap engagement means in said locating means adjacent to an inner surface of said housing.

4. The method of claim 1 further comprising the steps of providing said first and second snap engagement means to be snap engagable only when said stator and said locating means are in one relative position.

5. The method of claim 1 further comprising the steps of providing said first and second snap engagement means such that, when assembled, relative movement between said stator and said locating means is precluded.

6. The method of claim 1 further comprising the steps of providing said first snap engagement means with a tab projecting from said stator and providing said second snap engagement means with a recess in a receiving surface in said locating means.

7. The method of claim 1 further comprising the steps of providing said recess to extend about said locating means outer surface only to the extent needed to engage said tab, thereby preventing relative movement between said stator and said locating means.

8. The method of claim 1 further comprising the steps of providing said first snap engagement means with a tab projecting from said support means and said second snap engagement means with a tab extending from an outer surface of said printed circuit board.

9. The method of claim 1 further comprising the steps of providing a means for keying said stator to said printed circuit board to allow said stator-printed circuit board to be assembled only when said stator and said printed circuit board are in one relative position.

10. The method of claim 9 further comprising the steps of providing said keying means to further prevent relative rotation between said stator and said printed circuit board.

11. The method of claim 1 further comprising the steps of providing a plurality of electrical components, including a sensor, to comprise an electrical commutation means.

12. The method of claim 11 further comprising the steps of providing said electrical components to include an integrated circuit.

13. The method of claim 1 further comprising the steps of providing an integral means for attaching said printed circuit board to at least one other printed circuit board to form a printed circuit board array.

14. A method of assembling a motor comprising the steps of:
    affixing a printed circuit board having electrical components including a sensor to a surface of a housing;
    providing a stator having a stator support means with a first snap engagement means formed therein, said stator support means further receiving an electromagnet having a bottom surface;
    providing a locating means at a central position in said housing to extend from an interior surface thereof and terminating in an upper end portion, said locating means having a second snap engagement means formed adjacent to said housing surface and disposed away from said upper end portion;
    assembling said stator with said locations means by means of said first and second snap engagement means such that the snap engagement locates said electromagnet bottom surface of a predetermined, preferred distance from said sensor; and
    affixing a rotor to said housing.

15. The method of claim 14 wherein said first and second snap engagement means are snap engagable only when said stator and said locating means are in one relative position.

16. The method of claim 15 wherein said first and second snap engagement means further prevents relative movement between said stator and said locating means.

17. The method of claim 15 wherein said first snap engagement means comprises a tab projecting from said stator and wherein said second snap engagement means comprises a recess in a receiving surface in said locating means.

18. The method of claim 16 wherein said recess extends about said locating means outer surface only to the extent needed to engage said tab, thereby preventing relative movement between said stator and said locating means.

19. A method of assembling brushless electric motors comprising:
molding a planar array of printed circuit boards, said printed circuit boards each having an integral means for attaching adjacent printed circuit boards in said array to one another;
assembling each of said printed circuit boards with a plurality of electrical components including a triggering sensor, the printed circuit boards also including a commutation circuit;
molding a corresponding plurality of stator support means;
assembling said stator support means with electrical connectors;
forming at least one electromagnet on said stator support means, thereby forming a stator;
assembling each one of said stators with a corresponding one of said printed circuit boards, thereby forming stator - printed circuit board assemblies;
electrically connecting said printed circuit boards to said corresponding stator electromagnets;
separating said stator - printed circuit board assemblies from one another;
assembling each of said stator-printed circuit board assemblies with a corresponding locating means centrally positioned within a motor housing; and
affixing a rotor to said locating means.

20. The method of claim 19 further comprising the steps of providing electrical components that include an integrated circuit.

21. The method of claim 20 further comprising the steps of providing said integrated circuit with said triggering sensor.

22. The method of claim 19 further comprising the steps of soldering said stator electrical connectors to said respective printed circuit board.

23. The method of claim 22 wherein said soldering step includes the step of automatically soldering each of said printed circuit boards in said soldering array to said corresponding stator support means.

24. The method of claim 19 further comprising the steps of providing said printed circuit board and said stator support means with corresponding snap engagement means formed in said printed circuit boards and said stator support means, respectively.

25. The method of claim 19 comprising the steps of providing said printed circuit boards with an integrally formed pedestal for receiving said sensor.

26. The method of claim 19 further comprising the steps of providing said stator support means and said printed circuit boards further comprise cooperative key means for providing self-fixturing therebetween.

27. A method of assembling a motor from an array of molded printed circuit boards each printed circuit board having a plurality of electrical components that comprise an electrical commutation circuit and each having an integral projection with a first engagement means adjacent a free end portion thereof, said method comprising the steps of:
affixing a stator at a second engagement means to a printed circuit board first engagement means forming a stator - printed circuit board assembly;
electrically connecting for each of said stator - printed circuit board assemblies said stator to said printed circuit board;
separating said stator - printed circuit board assemblies from said array;
affixing each of said stator - printed circuit board assemblies at a third engagement means thereof to a corresponding fourth engagement means of a locating means within a housing; and
affixing a rotor to said locating means.

28. The method of claim 27 wherein said electrically connecting step further comprises, for each assembly, the steps of soldering each stator to said corresponding printed circuit board at contacting electrical terminals.

29. The method of claim 28 wherein said soldering step further comprises the steps of automatically soldering said terminals.

30. The method of claim 27 further comprising the steps of providing said stators and said printed circuit boards with a cooperative key means so that said stator will receive said printed circuit boards only in one relative position.

31. The method of claim 27 further comprising the steps of providing said stators and said housing locating means with a cooperative key means so that said stators will receive said housing locating means in only one relative position.

32. The method of claim 27 further comprising the steps of:
forming an electromagnet on each of said stators; and
affixing a plurality of electrical connectors with said electromagnets on said stator.

33. The method of claim 27 further comprising the steps of inserting electrical terminals into stator receptacles, said terminals for providing electrical contacting surfaces between said stators and said printed circuit boards.

34. A method of assembling brushless electrical motors from an array of molded printed circuit boards each printed circuit board having a plurality of electrical components that comprise an electrical commutation circuit, including a sensor, and each printed circuit board having a first attachment means and an integral projection with a precisely located surface at the free end portion thereof with said sensor mounted on said surface, said method comprising the steps of:
affixing a stator, at a second attachment means thereof, to corresponding ones of said printed circuit board first attachment means to form assemblies such that said sensor is positioned at a selected angular distance between and displacement from poles of an electromagnet formed on said stator;
electrically connecting said stators to said printed circuit boards;
separating said assemblies from said array;
affixing each of said assemblies at a third attachment means thereof to a corresponding fourth attachment means of a locating means extending from an inner surface of corresponding housing; and
affixing a rotor to each of said locating means.

35. The method of claim 34 further comprising the steps of inserting electrical terminals into stator receptacles, said terminals for providing electrical contact between said stators and said printed circuit boards.

36. The method of claim 34 wherein said electrically connecting step further comprises, for each assembly, the steps of soldering each stator to said corresponding printed circuit board at said contacting terminals.

37. The method of claim 34 wherein said soldering step further comprises the steps of automatically soldering said contacting terminals.

38. The method of claim 34 further comprising the steps of providing said stators and said printed circuit boards with a cooperative key means so that said stators will receive said printed circuit board only in one relative position.

39. The method of claim 34 further comprising the steps of providing said stators and said housing locating means with a cooperative key means so that said stators will receive said housing locating means in only one relative position.

40. The method of claim 34 further comprising the steps of forming an electromagnet on each of said stators; and affixing a plurality of connectors with said electromagnets on said stator.

* * * * *